Nov. 26, 1957  T. A. REPPER  2,814,345
ROTARY SCRAP CUTTERS
Filed Dec. 30, 1953  4 Sheets-Sheet 1
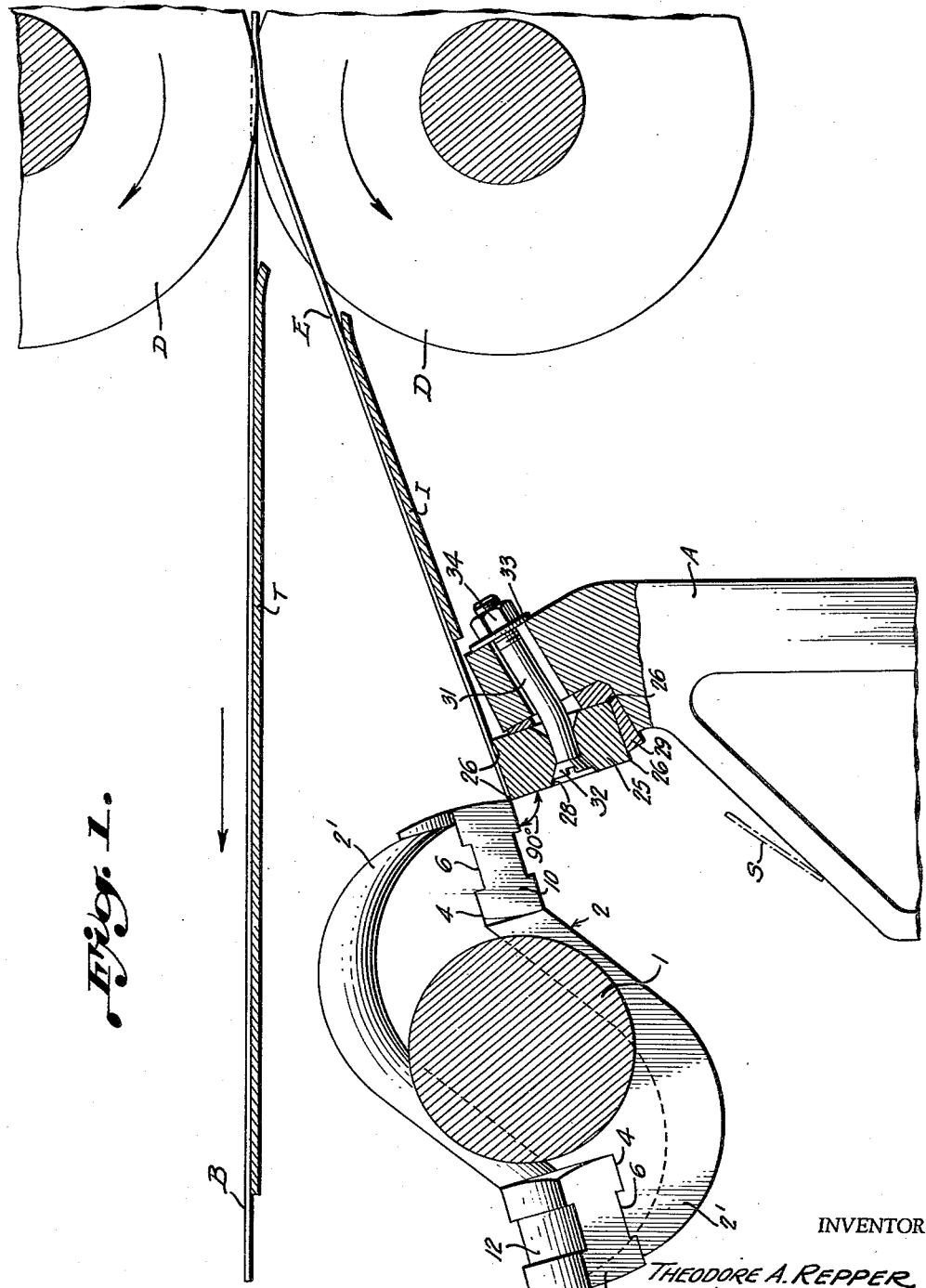
INVENTOR
THEODORE A. REPPER
BY
ATTORNE

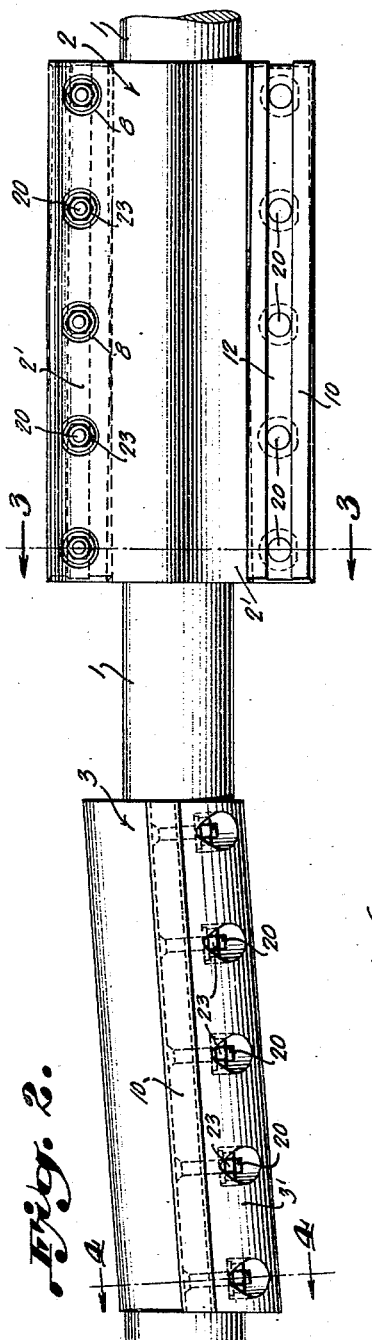
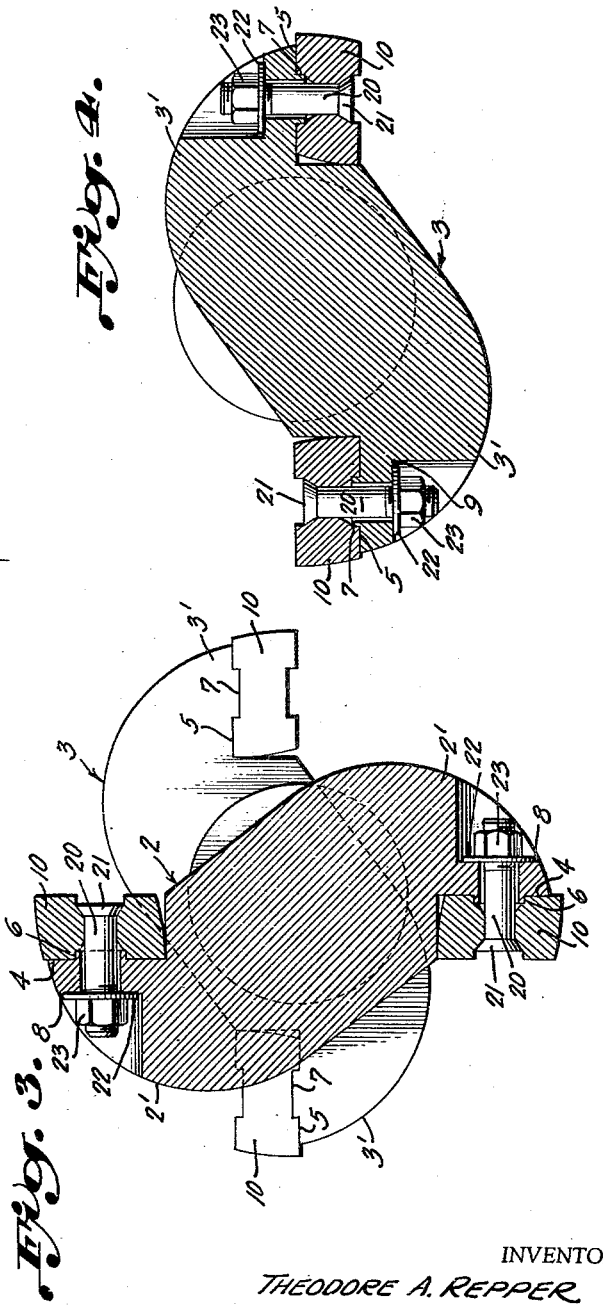

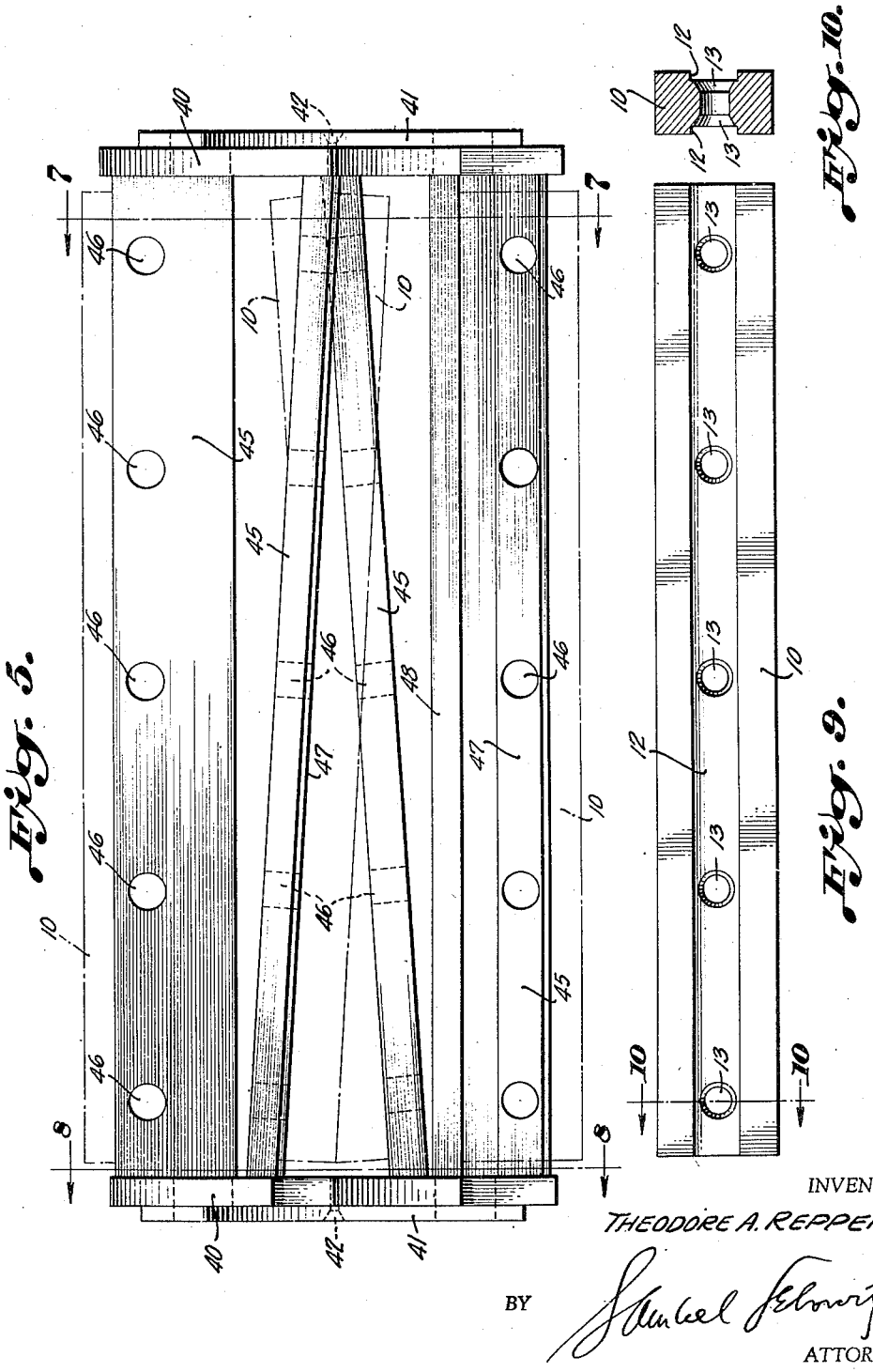

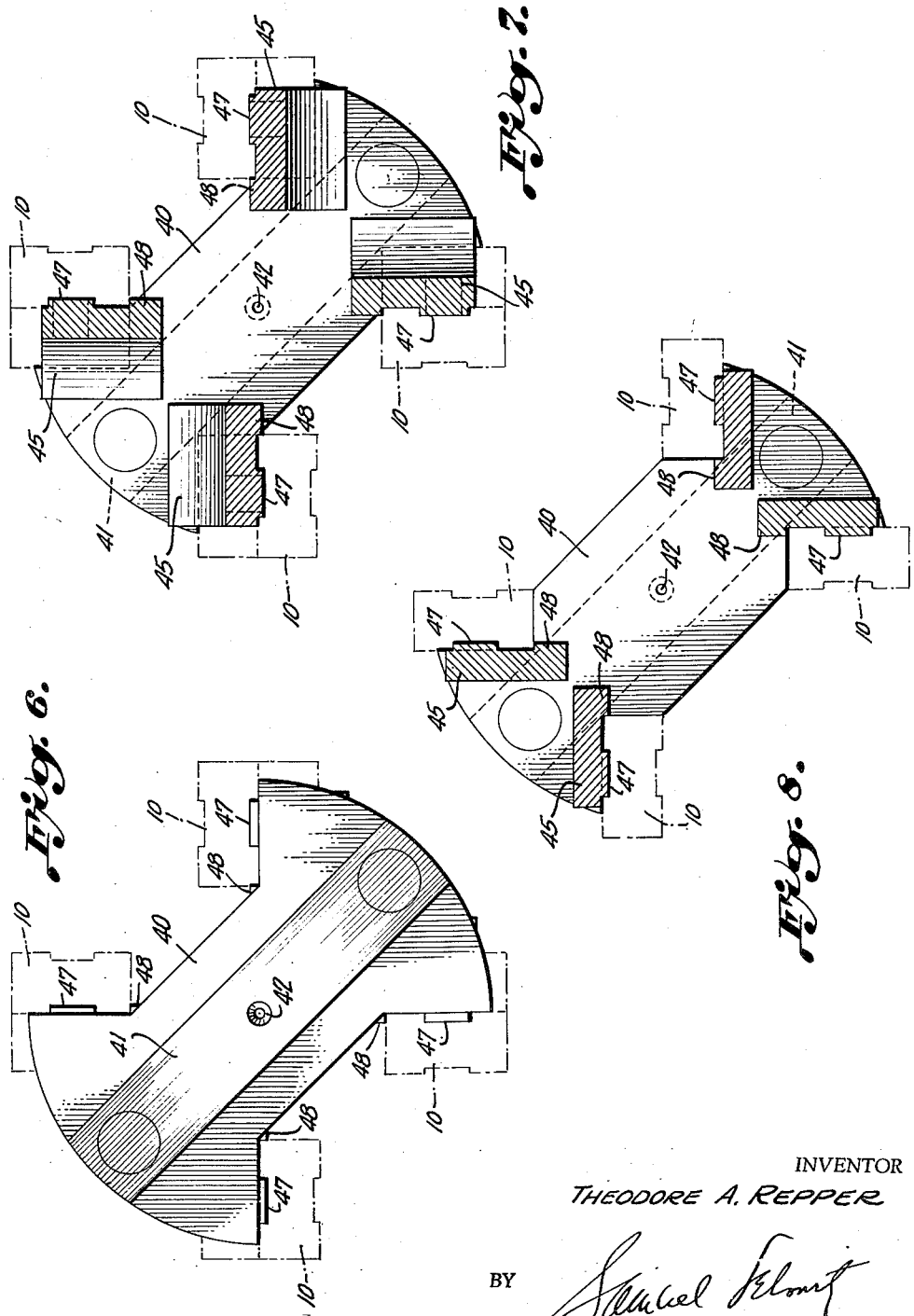

United States Patent Office 2,814,345
Patented Nov. 26, 1957

2,814,345

ROTARY SCRAP CUTTERS

Theodore A. Repper, Middletown, Ohio

Application December 30, 1953, Serial No. 401,200

2 Claims. (Cl. 164—66)

This invention relates to rotary scrap cutters and more particularly to rotary choppers for cutting into small pieces the side trimmings from a sheet of metal to eliminate the twisting of these trimmings as the sheet of metal travels continuously in the course of edge finishing operations.

It is the object of the present invention to improve rotary scrap cutters and shears which are used in the trimming of continuous bands of sheet metal, as exemplified by the machines shown in U. S. Patents Nos. 2,242,847, May 20, 1941, and 2,497,155, February 14, 1950.

It is a further object of the invention to provide a machine capable of cutting the scrap edges of sheet metal into small pieces with cutter bars of rugged design which may be sharpened easily on a rotary jig whereon they may be disposed in positions corresponding to their positions on the rotary cutter shaft or arbor.

It is a primary object of the invention to provide detachable cutters on a rotary cutter shaft or arbor which are capable of easy interchangeability and which cooperate with a stationary cutter bar in a manner to perform a progressive cut on the material being fed between the cutting edges. This progressive cut is attained by virtue of the angular disposition of the rotary cutter bars relative to the axis of the rotary shaft, resulting in a drawing cut upon the material which may be executed easily even on heavy gauge sheets, for example, ⅜" stock.

It is a further object of the invention to provide for the efficient and smooth operation of the cutter mechanism despite the heavy work performed thereby by staggering the cuts of the material being fed to the cutters on the opposite sides of the sheet being trimmed.

It is a further object of the invention to simplify the mounting of the cutter bars on the rotary shaft or arbor by providing seating surfaces therefor of large extent, in addition to long key channels for the purpose of maintaining the cutter bars in secure position on the arbor. Likewise, the cutter bar on the stationary anvil may be seated securely thereon in position for most effective cutting by virtue of a filler bar between the cutter bar and stationary anvil.

The invention proceeds upon the principle of disposing one or more cutter bars on a rotary shaft angularly with respect to the axis of the shaft. A stationary cutter bar, with its cutting edge parallel to the axis of the rotary shaft, is mounted on an anvil adjacent to the rotary shaft, and is designed to cooperate with the rotary cutter bar in such a manner that when a strip of material is fed between the two cutting edges, the rotary cutter bar comes into cooperative action with the stationary cutting edge progressively, starting at one end of the cutting edge and progressively executing a "draw" cut on the material as the rotary cutting edge continues its rotary movement. This action is repeated as each successive angularly disposed cutter bar on the rotary shaft comes into the field of action of the stationary parallelly disposed cutter bar. Preferably, the cutter bars are disposed on arms which are diametrically opposed and the arms of one end of the machine are displaced 90° with respect to the arms on the opposite end of the machine in order to stagger the cuts of the material on the opposite sides of the machine and thereby to even out the load on the driving mechanism of the machine.

The invention also contemplates a jig mounting in which the cutter bars of substantially rectangular cross-section are mounted on bar frames of a size corresponding to the rotary shaft or arbor of the cutting mechanism so that the cutting edges may be ground in conformity to the cutting surfaces sought to be attained when the cutter bars are in operative position in the scrap cutting machine.

Other objects and purposes will appear from the detailed description of the invention following hereinafter, taken in conjunction with the accompanying drawings, wherein Fig. 1 is a side elevation with certain parts in section, showing the operation of the rotary scrap cutter in accordance with the invention;

Fig. 2 is a front elevation of the rotary shaft or arbor mounting the sets of cutter bars adjacent to the opposite ends thereof;

Fig. 3 is a vertical sectional view along line 3—3 of Fig. 2;

Fig. 4 is a vertical sectional view along line 4—4 of Fig. 2;

Fig. 5 is a front elevation of a rotary jig for mounting the cutter bars in position for sharpening the multiple edges thereof;

Fig. 6 is a right end view of the jig shown in Fig. 5;

Fig. 7 is a vertical sectional view along line 7—7 of Fig. 5;

Fig. 8 is a vertical sectional view along line 8—8 of Fig. 5;

Fig. 9 is a front elevation of a cutter bar in accordance with the invention; and Fig. 10 is a vertical sectional view along line 10—10 of Fig. 9.

In Fig. 1 is shown the general assembly in which the present invention finds especially useful application, namely, in the cutting of the side trimmings E from continuous sheets of metal B into small scraps S in order that the trimmings E may not curl and interfere with the continuous feed of the sheet material B. The cutter discs D are shown cutting the band of material B which continues to travel over the table T for the purpose of further processing or reeling, while the trimmed lateral edges E are directed downwardly along the inclined table I out of the path of the main band of the material. The edges E are fed to the rotary scrap cutter in accordance with the invention whereat they are cut into small pieces S for convenient collection and removal.

The instant invention is primarily concerned with the structure, mounting arrangement and sharpening of the rotary and stationary cutter bars, and therefore details of the drive of the cutting apparatus are not shown since these are known in the art and are well illustrated in the patents mentioned above.

The rotary shaft or arbor 1 is a heavy duty shaft and is provided with radially disposed winged arms 2 and 3 adjacent the opposite ends thereof. The length of the shaft, as well as the arms, may vary depending upon the size of the machine in which the cutting mechanism finds application. This length may run about seven feet between the extreme ends of the winged arms and the end of each shaft may extend further about two feet for the purpose of accommodating the oil seals, the journals therefor which are mounted in roller bearings, the spacers, and the flywheels. The substantial lengths of the wings enable the cutting of scrap from sheets of different widths and may be varied for different applications.

Preferably, the winged arm 2 on one side of the machine is provided with a pair of diametrically disposed extensions 2' each having a plane seat 4 extending longitudinally thereof at an angle to the longitudinal axis of the shaft 1. The angularity or "rake" of this seat is about ½" to the foot and a uniformly projecting key 6 extends from the seat centrally thereof. Likewise, the winged arm 3 adjacent to the opposite end of the shaft is provided with radial extensions 3', 3' which are diametrically opposed and which are displaced 90° relative to the arms 2', 2'. Here again, the arms are provided with angularly disposed seats 5 and keys 7 extending the full length thereof for the purpose of securely seating a face of the cutter bars 10 thereagainst. The securement of the cutter bars 10 against the seats 4 and 5 and the longitudinal keys 6 and 7, respectively, is effected by means of a plurality of flat-headed bolts 20 which pass through countersunk openings 13 at displaced points along the length of the cutter bar and which are aligned with openings in the arms 2', 2' and 3', 3' extending perpendicularly to the seats 4 and 5 and which are maintained in tight engagement with the arms by the provision of washers 22 and bolts 23 against the walls 8 and 9 of the recesses formed in arms 2' and 3', respectively, behind the seats 4 and 6, respectively. The cutter bars 10 (Figs. 9 and 10) are of substantially rectangular cross-section and are channeled along the centers of the opposite faces at 12. These channels selectively accommodate the longitudinal keys 6 and 7 on the wings of the arbor and firmly seat thereon by means of the bolt and nut fastenings 20—23.

The provision of five bolts in each cutter bar assures a secure mounting of the cutter bar on the rotary shaft and this mounting is not affected by the heavy cuts which the cutting mechanism is called upon to execute. The stationary cutter bar 25 is provided with four cutting edges 26 at each of the corners which may be interchanged by the detachment of the cutter bar 25 from the anvil A upon disengagement of the nut 34 and washer 33 in threaded engagement with the flat-headed bolt 31, the sloping head 32 of which engages the countersunk opening 28 in the cutter bar. A filler bar 29, having a rectangular seat therein is disposed between the stationary cutter bar 25 and the anvil A in order to dispose the approaching face of the cutter bar 10 at substantially right angles to the base of the cutting edge 26. This insures a more effective drawing cut between the angularly disposed movable cutter bar 10 and the stationary parallel cutter bar 25.

As may be seen in Figs. 1 to 4, each cutter bar 10 is straight with its central part overlying the longitudinal axis of the rotary shaft 1 (Fig. 2), so that a common plane contains the last-mentioned axis, a radius of shaft 1 extending perpendicularly from its axis and the midportion of the longitudinal axis of the cutter bar. The ends of each cutter bar lead and lag its central portion, so that if the cutter bars are ground upon a common surface of revolution, the section of each cutter bar varies gradually from end to end with the cutting edge at the end adjacent section line 4—4 forming an acute angle while the cutting edge adjacent the inner end of the cutter bar forms an obtuse angle with a symmetrical section of the exposed edges existing only at the center of the cutter bar. This makes possible the interchanging of the cutting edges so that in every case an effective draw-cut is obtained.

The present invention enables a convenient dismantling of the cutter bars for the purpose of sharpening them and a special jig for effecting that purpose is shown in Figs. 5 to 7.

This jig is formed of end plates 40 backed by bars 41 provided with center holes 42. Special bars 45, having medial and end projections 47 and 48, extending longitudinally and equidistantly between the end plates, serve to seat securely the cutter bars at the intermediate channels 12 as well as at the ends thereof with the aid of a plurality of bolts extending through openings 46 in the several bars. As shown in Figs. 5 to 8, the bars 45 seat four cutter bars, indicated in dotted lines, at equidistant intersecting center lines with a uniform inclination with respect to the longitudinal axis of the rotary jig or support. The bars 45 are disposed radially and angularly with respect to the longitudinal axis of the jig with the same inclination as are the seats 4 and 5 in the radial arms 2 and 3 of the rotary cutter. The rotation of the jig with respect to a grinding wheel results in a sharpening of the edges of the cutter bar 10. Thus, the cutting edges of the cutter bars are sharpened along lines identical to those encountered by them in their cooperative functioning with the cutting edge of the stationary rectilinear cutting bar 25.

Of course, it is understood that if a sheet of material is trimmed only along a single edge thereof, when a single set of the cutter arms will be effective, the same will require only a single stationary cutter bar 25 cooperating therewith. If both edges of the sheet are being trimmed, two stationary cutter bars are required and these may be mounted upon separate anvils or upon a unitary anvil in a manner similar to the common mounting of the rotary cutters on the winged arms 2 and 3 of the single rotary shaft. If desired, more than two cutters may be disposed on the rotary shaft or arbor.

While I have described my invention as embodied in a specific form and as operating in a specific manner for purposes of illustration, it should be understood that I do not limit my invention thereto, since various modifications will suggest themselves to those skilled in the art without departing from the spirit of my invention, the scope of which is set forth in the annexed claims.

I claim:

1. A rotary sheet metal scrap cutter comprising a rotary shaft extending transversely to the direction of feed of the sheet metal and embodying a plurality of arms extending equidistantly and radially therefrom, a seat on each of said arms extending radially and angularly relative to the longitudinal axis of said shaft, a straight cutter bar of substantially rectangular cross-section detachably mounted on each seat and having a plurality of cutting edges along its four corners to provide selectively one cutting edge remote from said seat, said cutter bar having the ends thereof terminating in planes including the radii of said rotary shaft which lead and lag with respect to the plane containing the radius to the midportion of said cutter bar, the outermost faces of said cutter bars forming part of a common surface of revolution to produce a cutting edge section which is unsymmetrical with respect to the inoperative exposed edge section at the opposite corner of said cutter bar except at said midportion thereof, a stationary anvil adjacent to said rotary shaft, and a second cutter bar detachably mounted on said anvil and provided with a cutting edge which is parallel to the axis of said rotary shaft and in position for co-action with said one cutting edge of said first cutter bar, the angularity between the edges of said cutter bars resulting in a progressive cut on a sheet of material fed between the rotary shaft and stationary anvil.

2. A rotary metal scrap cutter comprising a rotary shaft extending transversely to the direction of feed of the metal embodying a pair of arms extending diametrally therefrom adjacent to one end of said shaft and a corresponding pair of diametrally opposed arms adjacent to the opposite end of said shaft with the pairs displaced 90° relative to each other, a seat on each of said arms extending radially and angularly relative to the longitudinal axis of said shaft of a degree approximating the ratio of a half inch transversely to twelve inches in a longitudinal direction, a straight cutter bar detachably mounted on each seat and provided with a cutting edge displaced from said seat, said cutter bar having the ends thereof terminating in planes including the radii of said rotary shaft which lead and lag with respect to the plane containing the radius to the midportion of said cutter bar, the outermost faces of said cutter bars forming part of a common surface of revolution to produce a cutting edge section which is unsymmetrical with respect to the inoperative exposed edge section at the opposite corner of said cutter bar except at said midportion thereof, a stationary anvil adjacent to each end of said rotary shaft, and a second cutter bar detachably mounted on each anvil with its cutting edge parallel to the axis of said rotary shaft and in position for co-action with the cutting edges of said first cutter bars, the angularity between the edges of said cutter bars resulting in progressive cuts on sheets of material fed between the rotary shaft and stationary anvils, and said cuts being staggered by said pairs of radial arms.

References Cited in the file of this patent

UNITED STATES PATENTS

| | | |
|---|---|---|
| 331,934 | Aiken | Dec. 8, 1885 |
| 394,950 | Badger | Dec. 25, 1888 |
| 487,621 | Hidden | Dec. 6, 1892 |
| 814,813 | Swift | Mar. 13, 1906 |
| 1,107,762 | Cumfer | Aug. 18, 1914 |
| 1,140,897 | Frank | May 25, 1915 |
| 1,145,039 | Schutte | July 6, 1915 |
| 1,321,838 | Martell | Nov. 18, 1919 |
| 2,001,021 | Heard | May 14, 1935 |
| 2,242,887 | Holdgate et al. | May 20, 1941 |
| 2,345,411 | Moeller | Mar. 28, 1944 |
| 2,387,767 | Nordquist | Oct. 30, 1945 |